C. W. COBURN.
SHOCK ABSORBER.
APPLICATION FILED DEC. 4, 1919.

1,419,614.

Patented June 13, 1922.

Clarence W. Coburn
INVENTOR.

UNITED STATES PATENT OFFICE.

CLARENCE W. COBURN, OF SAN FRANCISCO, CALIFORNIA.

SHOCK ABSORBER.

1,419,614. Specification of Letters Patent. Patented June 13, 1922.

Application filed December 4, 1919. Serial No. 342,443.

*To all whom it may concern:*

Be it known that I, CLARENCE W. COBURN, a citizen of the United States, and a resident of the city and county of San Francisco, State of California, have made a new and useful invention—to wit, Improvements in Shock Absorbers; and I do hereby declare the following to be a full, clear, concise, and exact description of the same.

This invention relates particularly to an improved shock absorber.

A further object of the invention consists in providing means for limiting the expansive or contracting movement of the shock absorbing means. A further object of the invention is to provide shock absorbers that will be superior in point of simplicity, inexpensiveness of construction, positiveness of operation, facility and convenience in use and general efficiency as contrasted with other devices of a similar nature. Other objects and advantages will appear as this description progresses.

In this specification and the drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

Figure 1:
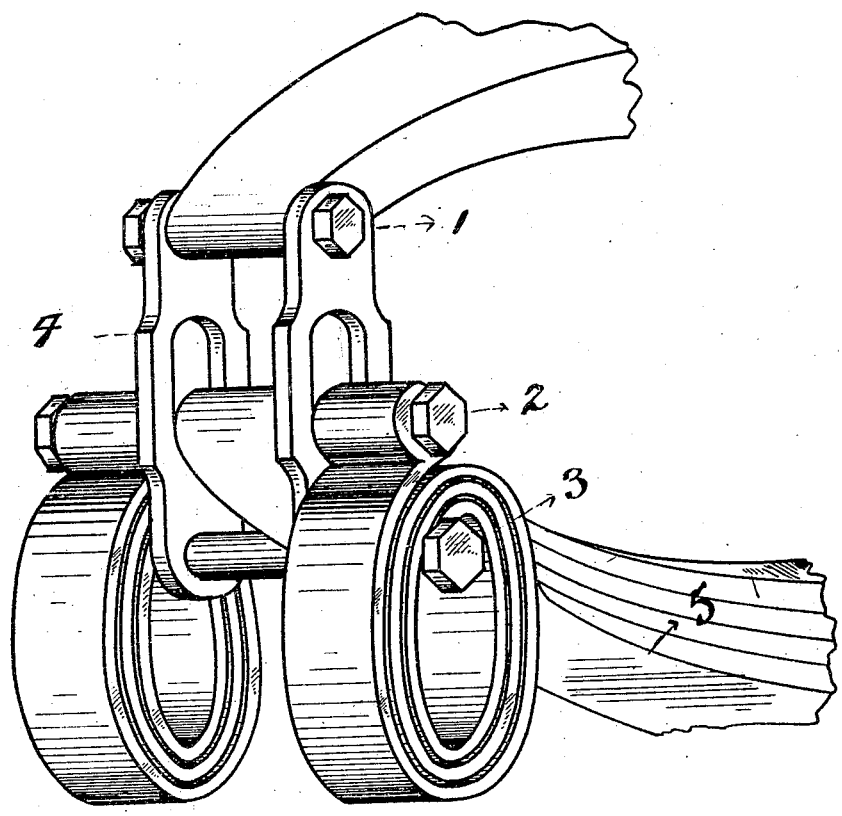

In the drawing Figure 1 represents a perspective view of an assembled shock absorber constructed in accordance with my invention applied in operative position to a vehicle.

Figure 2:
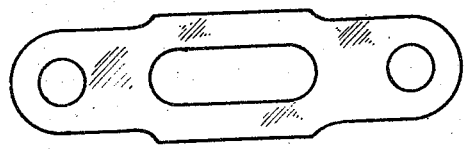

Figure 2 represents an enlarged detail view of one of the links or check plates used in my invention.

In detail the construction illustrated in the drawings, with reference to Figure 1 comprises a vehicle, more particularly an automobile having the usual body portion connected to the wheel supporting axle through the usual springs. As is the custom in automobile construction, one portion of the spring body is attached to the vehicle body and remains relatively stationary thereto. It formerly was and in some cases still is the practice to make the upper member secured to the vehicle body in the form of a curved leaf spring but for economy in construction and other beneficial results, it has become the practice to extend the end of the chassis supporting frame beyond the end of the body and to curve the end thereof slightly to form what is known in the practice as a "horn." The curved, leaf bearing spring 5 in accordance with standard practice is secured to the wheel axle frame by U-bolts or other appropriate fastening means and the ends of said spring are secured relatively to the "horn" end of the chassis frame and to the body of the vehicle by shackles or other appropriate connecting media.

My invention contemplates eliminating the usual non-resilient shackle members and substituting in lieu thereof resilient spring shock absorbing devices. The spring shock absorbing device consists of a pair of shackle or check plates 4 having openings in the ends thereof and adapted to be secured to the "horn" of the chassis frame by a bolt 1 passing through the ends of said check plates and the end of said "horn." The opposite ends of the check plates 4 are provided with openings therethrough similar to those previously described through which a bolt 3 is adapted to be passed and to be fixedly secured so that the ends thereof project beyond the faces of the respective check plates. The body portion of each shackle plate intermediate the ends thereof is provided with an elongated opening or slot therein through which a bolt 2 is adapted to be slidably retained and adapted to be connected to an end of a leaf spring 5 mounted on the axle housing. For the reason that the axle moves relative to the chassis frame, it will be obvious that the end of the said spring secured to the bolt 2 will move in the elongated openings provided in the check plates. Convolute spring members 6 are adapted to be mounted on the outer sides of the check plates 4 and interposed between the ends of the bolt 2 on the leaf spring and the ends of the bolt 3 fixed in the check plates. The spring is substantially S-shaped in contour, the outer end thereof being formed with a bearing for engagement with the ends of the bolt 2 and the inner end being formed with a bearing for engagement with the ends of the fixed bolt 3. Although I have shown the convolute spring 6 with an end thereof placed eccentrically relative to the spring convolutions, I do not wish to limit my invention thereto as it would be clearly within the purview of my invention to modify or change the locations of the respective spring ends relative to each other. In this case reference is made to patents on shock absorbers owned by my corporation and issued respectively to J. St. Martin No. 1,075,498, October 14th, 1913 and to Chris P. Johnson, No. 1,093,187, April 14th, 1915. It will be obvious that the placing of a pair of spaced convolute spring members on opposite sides of a leaf spring in combination with the particular form of shackle plates shown, comprises an improvement over either of the patents above mentioned.

Having thus described this invention, what I claim and desire to secure by Letters Patent is:

A shock absorber comprising a pair of link members, having vertical slots therein, held in spaced relation by a connecting bolt adapted to be secured to a relatively stationary part of a vehicle; a bolt slidably retained in the slots in said link members and adapted to be mounted on a part of said vehicle movable relatively to said first mentioned part; a bolt fixed in the opposite ends of said link members and a pair of convolute spring members mounted on the outside of said link members and adapted to have the ends thereof pivotally secured to the opposite ends of said movable and fixed bolts and to be interposed therebetween.

In testimony whereof, I affix my signature in the presence of two witnesses.

CLARENCE W. COBURN.

Witnesses:
F. L. McLillan,
A. B. Wilson.